Feb. 6, 1940.     L. F. WHITNEY     2,188,990
SEALING DEVICE
Filed April 13, 1937
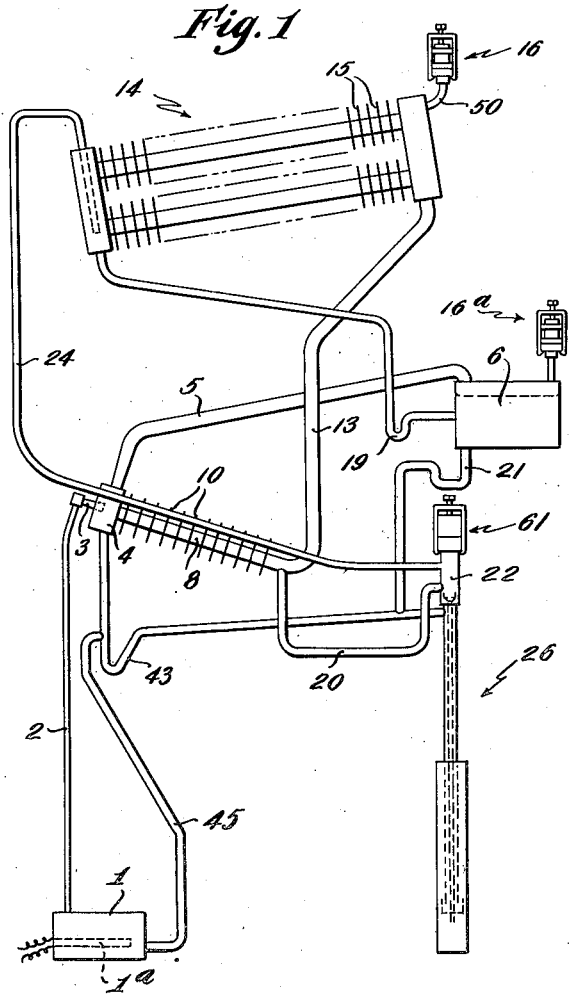
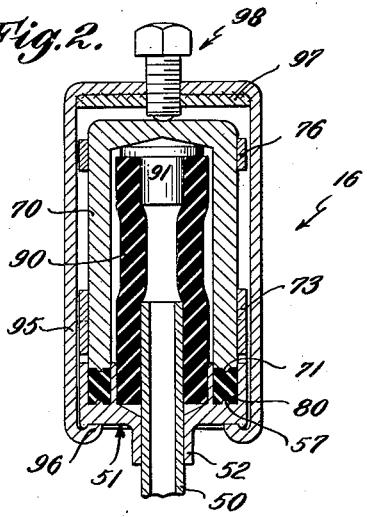
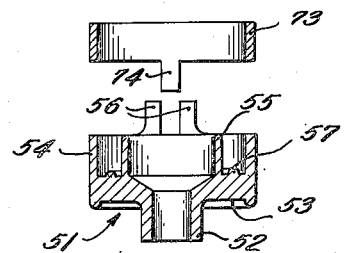
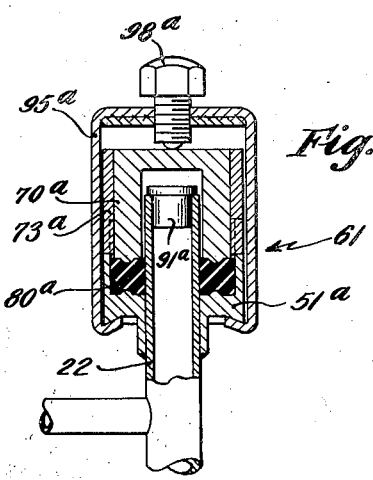
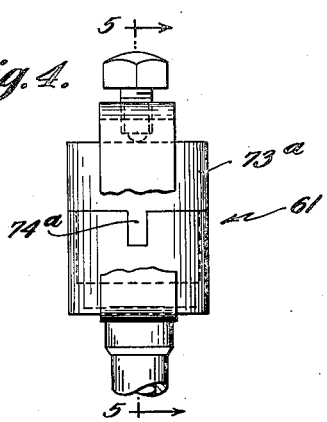
Inventor,
Lyman F. Whitney,
by Roberts, Cushman & Woodberry
Attys.

Patented Feb. 6, 1940

2,188,990

UNITED STATES PATENT OFFICE 2,188,990

SEALING DEVICE

Lyman F. Whitney, Cambridge, Mass., assignor, by mesne assignments, to Stator Corporation, a corporation of Rhode Island Application April 13, 1937, Serial No. 136,612

10 Claims. (Cl. 138—89)

This invention relates to sealing devices for low pressure heat exchange apparatus or the like, and more particularly to such devices on low pressure refrigerating systems such as are disclosed in the United States Patent No. 1,761,551 to Eastman A. Weaver. Devices of the type provided by the present invention permit the convenient exhaustion of atmospheric air from the interior of such a system, and thereupon the sealing of the system effectively against the inward leakage of atmospheric air, so that a very low internal pressure may be maintained indefinitely. Such a device may also permit the convenient introduction of the working fluids into the system before the air is exhausted. A device of this character may comprise a socket in which a sealing ring or gasket of rubber or the like is disposed, a suitable inverted cup-like member or cap being arranged to be pressed firmly against the rubber sealing ring. In accordance with this invention, the socket member and the cap may preferably both be provided with ribs of annular form which bite into the yieldable material of the sealing ring firmly to press the same against the walls of the socket, thus assuring a firm seal. The cap may conveniently be tightened in place by a single screw-threaded member associated with a detachable stirrup extending over the cap and having leg portions engaging the socket member. Thus the device may easily be disassembled when it is desired for any reason to obtain access to the interior of the system. A suitable tube of yieldable material, such as a relatively heavy rubber tube, may be disposed within the cap member and may communicate with the interior of the system. The passage provided by the tube may be stopped by a suitable plug after air has been exhausted through the same.

Devices of this character may also be employed in combination with purger assemblies which are commonly used with low pressure refrigerating systems of the character disclosed in the above-identified Weaver patent. Thus such a device may be conveniently arranged above a removable drop tube so that access may be obtained to the interior of the system to permit removal and replacement of the purger drop tube when desired.

In the accompanying drawing:

Fig. 1 is a diagrammatic view of a refrigerating system with sealing devices of the type provided by the present invention associated therewith;

Fig. 2 is a central vertical section on an enlarged scale of one of the sealing devices shown in Fig. 1;

Fig. 3 is a central sectional view taken at right angles to the plane of Fig. 2 and showing certain cooperating parts of the sealing device in slightly spaced position;

Fig. 4 is a broken side elevational view of the sealing device employed for the purger; and Fig. 5 is a section indicated by line 5—5 of Fig. 4.

For purposes of illustration, the accompanying drawing shows a simple form of refrigerating system with which sealing devices constructed in accordance with the present invention may be employed. A system of this type may be provided with a boiler 1 provided with an electrical heater 1a. The boiler normally contains a body of liquid propellant, e. g., mercury. During normal operation, propellant vapor passes upwardly from the boiler 1 through a riser duct 2 to an aspirator nozzle 3. Propellant vapor issues at high velocity from the nozzle 3 into the mixing chamber 4 which is connected by a vapor duct 5 with the cooler 6. The latter may contain a body of aqueous refrigerant such as water or a suitable anti-freeze agent in solution with the water. Refrigerant vapor is drawn from the cooler 6 through the pipe 5 to the mixing chamber 4 where it is entrained in the propellant vapor stream. The mixed vapors pass into a funnel 8 where the refrigerant is compressed and propellant may be condensed. Suitable cooling means such as fins 10 are provided to aid the condensation of this propellant. The refrigerant vapor from the funnel 8 passes upwardly through the duct 13 to the condenser 14 which may be of any suitable type, as shown, being provided with fins 15 to facilitate air cooling. The condenser is provided with a device 16 constructed in accordance with this invention to permit initial exhaustion of air from the system and the subsequent sealing of the system against inward leakage of atmospheric air, while a similar device 16a may be provided on the cooler.

A sealing device 61 is mounted on the upper part of the entraining chamber 22 of the purger 26 in the manner more fully disclosed in my copending application Serial No. 167,402 filed October 5, 1937, which also contains a more complete disclosure of a system of the character which has just been described.

The present invention relates particularly to the construction and arrangement of the sealing devices 16, 16a and the similar sealing device 61. Referring to Figs. 2 and 3, which illustrate the details of the former, it is to be understood that the device is provided with a short connecting tube 50 extending to the upper part of the condenser 14. A cup-like socket member 51 has a tubular extension 52 welded to the tube 50, a portion of which projects upwardly within the member 51. The latter is shown more particularly in Fig. 3, and comprises an annular lower wall 53 disposed about the tubular portion 52, and an outer upwardly extending annular side wall 54. An inner annular side wall 55 is disposed concentrically within the wall 54 so that these two walls define an annular recess or groove which is open at its top. The outer wall 54 is provided with opposite pairs of spaced protuberances or castellations 56 which extend above the remainder of the socket member. An annular rib 57 is formed on the bottom wall 53 of the socket member and is disposed at the bottom of the annular groove between the cylindrical walls 54 and 55.

The device is also provided with an upper cap 70 with an annular rib 71 at its lower edge which may conveniently correspond in size and diameter to the rib 57. A positioning ring 73 is secured to the lower part of the cap 70 being provided with opposite downwardly extending protuberances 74 which are adapted to fit between a corresponding pair of protuberances 56 of the socket member when the cap is fitted over the socket member. A second ring 76 may conveniently be disposed about the upper part of the cap 70. A suitable sealing ring 80 of yieldable material such as rubber, is disposed within the annular groove between the walls 54 and 55 of the socket member 51, this sealing ring being arranged so that it may be compressed firmly against the inner and outer walls 54 and 55, as the lower edge of the cap 70 is pressed downwardly on the ring.

When a sealing device of this type is to be employed to permit the exhaustion of non-condensable gases from the system and the subsequent filling and sealing of the system, a rather heavy tube 90 of yieldable material, such as rubber, may be fitted over the portion of the metal tube 50 that projects above the socket member 51. This rubber tube 90 may be temporarily connected to a suitable tubular member extending to a vacuum pump. When the vacuum pump has withdrawn substantially all of the air from the system, a suitable clamp may be secured upon the intermediate part of the tube 90, firmly to flatten the walls thereof to prevent the inward movement of air when the vacuum duct is disconnected. Thereupon a suitable plug 91 of non-porous material may be fitted firmly within the upper end of the rubber tube 90, above the clamp. The clamp may then be removed and the cap 70 may be disposed in engagement with the sealing ring 80, the parts 74 and 56 being arranged in interfitting engagement.

Thereupon the stirrup 95 may be positioned with its hooked lower ends in engagement with the lower wall of the socket member 51. The stirrup 95 may conveniently be a U-shaped member formed of strap metal and having the lower ends of its legs upturned, as designated by numeral 96, to fit about a flange on the lower part of the socket member. The upper part or bite portion of the stirrup member 95 may be provided with a reinforcing bar 97. A cap screw 98 is threaded through an opening in the upper part of the stirrup member 97 and has an end portion engageable with the cap 70. Accordingly, as the cap screw 98 is tightened, the upturned end portions 96 of the legs of the stirrup are pressed upwardly in firm engagement with the socket 51 and the cap screw forces the cap 70 downwardly in firm engagement with the yieldable sealing ring 80. As this occurs the annular ribs 57 and 71 bite into the yieldable ring 80, pressing the same firmly against the walls 54 and 55 of the socket member 51. Thus the sealing ring affords a dependable air-tight seal to prevent the inward leakage of air, while the plug 91 affords an inner secondary seal which aids in attaining this result. Obviously if desired, before exhaustion of air or other non-condensing gas from the system, the working fluids, e. g., mercury and water, may be introduced through the rubber tube 90 and the connecting tube 50 to flow into the condenser 14 and thus into the lower part of the system.

When it is desired to obtain access to the interior of the system, it is necessary to loosen the cap screw 98 so that the stirrup 95 may be removed from the device 16 and to lift the cap 70 from the socket member 51. Thereupon the plug 91 may be removed from the rubber tube 90 so that air or other gas may freely pass into the system.

The device 61, which is associated with the purger assembly, may be of the same general character as the devices 16 and 16a and the exact arrangement of a purger assembly with a device of this character is more fully disclosed in my copending application Serial No. 167,402 filed October 5, 1937.

The device 61 comprises many parts similar to the parts shown for the device 16, such parts being indicated by corresponding reference numerals. Thus the device 61 includes a stirrup member 95a similar to but smaller than stirrup 95, this stirrup member being provided with a cap screw 98a which engages a cap 70a having a lower annular rib which may bite into a sealing ring 80a received by a cup-like socket member 51a. The cup-like member 51a, however, is not provided with an inner annular wall, but the inner part of the ring 80a is pressed against the portion of the tube 22 which projects upwardly above the socket member 51a. The cap member 70a is provided with a positioning ring 73a having a downwardly protuberant portion 74a engageable in sockets in the outer annular wall of the cap member 51a, as shown in Fig. 4. The device 16 is preferably provided with a plug 91a fitting within the open end of the tube 22. It is evident that when the device 61 is to be arranged in its normal operative position, the plug 91a is first fitted within the upper end of the tube 22, the cap 70a is disposed over the sealing ring 80a which fits within the annular groove provided by the cup member 51a and the upper end of the tube 22. When this is done the protuberances 74a on the ring 73a of the cap, fit within the corresponding recesses in the cup member 51a. The stirrup 95a is then positioned with the extensions of the lower ends of its legs under the bottom wall of the cup 51a and the cap screw 98a is then tightened to press the cap 70a firmly in engagement with the sealing member 80a. Since the cap 70a and the cap 51a are provided with annular ribs which bite into the yieldable material of the ring, the latter is firmly pressed in engagement with the walls of the assembly.

It is to be understood that the protuberances 74 and 74a are effective in positioning the caps 70 and 70a, respectively, so that they do not tend to rotate as the corresponding cap screw is tightened or loosened. Accordingly scoring of the rubber of the sealing ring is avoided and the maintenance of an air-tight seal is substantially facilitated.

In practice, after a system of this character has been manufactured, air or other non-condensing gas may be withdrawn from the system through the tube 90 of sealing device 16, it being understood that the device 61 is closed while the system is thus being evacuated and that the device 16a may be open but the rubber tube thereof may be pinched to prevent leakage of atmospheric air into the system. When evacuation of the system has thus been effected, the device 16a preferably is connected to a suitable reservoir containing an inert gas, such as nitrogen, which is then controllably admitted to the system while the rubber tube 90 is clamped to prevent flow of gas through device 16. The system may thus be filled with the inert gas at atmospheric pressure, the caps 70 of the devices 16 and 16a being clamped in place so that the apparatus is made ready for shipping or storage until it is used. The filling of the system with inert gas in this manner substantially prevents oxidation of the metal parts thereof.

When the apparatus is to be put into use, the propellant, e. g., mercury, may first be introduced into the system. As a matter of convenience, the propellant may be introduced through both the devices 16 and 16a, such a method facilitating the filling of certain traps. Thus in the particular arrangement shown in Fig. 1, a measured quantity of mercury may be introduced through the device 16, passing through the duct 13 into the trap 20 and overflowing from the latter into the lower part of the purger assembly to seal the same. By tipping the apparatus, some of this mercury may also be caused to pass into the trap 19. Thereafter the remaining mercury required by the system may be introduced through the device 16a, thus filling the traps 21 and 43 and overflowing from the latter into the duct 45 and the boiler 1. The apparatus is then evacuated through the condenser sealing device 16. Refrigerant preferably may be introduced through the device 16a after partial evacuation has been effected through the device 16. Thereafter the evacuation may be completed to bring the internal pressure down to the desired low point.

Devices of the character shown herein permit the convenient evacuation of systems of the character shown and the filling of the same with the working fluids. It is desirable to provide both the devices 16 and 16a to facilitate the filling of all the necessary parts of the machine with the working fluids, especially when the system has a trap arrangement such as shown in my copending application Serial No. 171,325.

It is furthermore evident that the present invention affords simple sealing means which are effective in maintaining an air-tight seal for an indefinite period but which may readily be disassembled to afford access to the interior of the system when desired.

I claim:

1. A sealing device of the class described comprising a connecting tube, a socket member secured concentrically to the tube, with the end of the tube extending through the socket member, an annular sealing ring of yieldable material disposed within the socket member, a cap having an edge engaging the sealing ring, and clamping means to press the cap against the sealing ring, said socket member and cap being provided with interfitting portions to prevent the rotation of the cap when the clamping means are employed to press the cap against the sealing ring, said socket member and cap each having annular ribs engaging and biting into the yieldable material of the sealing ring.

2. A sealing device of the class described comprising a connecting tube, a socket member secured to the tube with the end of the tube extending through the socket member, a sealing ring of yieldable material within the socket member, the socket member affording an annular groove in which the sealing ring is disposed, a tube of yieldable material in telescoping engagement with the end of the connecting tube, a plug detachably fitting within the end of said tube of yieldable material, a cap enclosing the last-named tube and having an edge engaging the sealing ring, and clamping means effective to present the cap against the sealing ring and thereby to hold the latter in tight engagement with the walls of the groove.

3. A sealing device of the class described comprising a connecting tube, a socket member secured to the tube with the end of the tube extending through the socket member, a sealing ring of yieldable material within the socket member, the socket member affording an annular groove in which the sealing ring is disposed, a tube of yieldable material in telescoping engagement with the end of the connecting tube, a plug detachably fitting within the end of said tube of yieldable material, a cap enclosing the last-named tube and having an edge engaging the sealing ring, and clamping means effective to present the cap against the sealing ring and thereby to hold the latter in tight engagement with the walls of the groove, said clamping means comprising a stirrup having opposite legs extending at the sides of the cap and with inturned end portions engaging the socket, and a screw-threaded member extending through an internally threaded opening in the upper part of the stirrup and pressing the cap firmly against the sealing ring.

4. A sealing device of the class described comprising a connecting tube, a socket member secured to the tube with the end of the tube extending through the socket member, a sealing ring of yieldable material within the socket member, the socket member affording an annular groove in which the sealing ring is disposed, a tube of yieldable material in telescoping engagement with the end of the connecting tube, a plug detachably fitting within the end of said tube of yieldable material, a cap enclosing the last-named tube and having an edge engaging the sealing ring, and clamping means effective to press the cap against the sealing ring and thereby to hold the latter in tight engagement with the walls of the groove, said clamping means comprising a stirrup having opposite legs at the sides of the cap and socket with inturned end portions engaging the socket, and a screw-threaded member extending through an internally threaded opening in the stirrup member and pressing against the cap firmly to hold the latter in engagement with the sealing ring, said cap and socket each providing an annular rib engaging and biting into the yieldable material of the sealing ring.

5. A sealing device of the class described comprising a connecting tube, a socket member secured to the tube with the end of the tube extending through the socket member, a sealing ring of yieldable material within the socket member, the socket member affording an annular groove in which the sealing ring is disposed, a tube of yieldable material in telescoping engagement with the end of the connecting tube, a plug detachably fitting within the end of said tube of yieldable material, a cap enclosing the last-named tube and having an edge engaging the sealing ring, and clamping means effective to press the cap against the sealing ring and thereby to hold the latter in tight engagement with the walls of the groove, said clamping means comprising a stirrup having opposite legs at the sides of the cap and socket with inturned end portions engaging the socket, and a screw-threaded member extending through an internally threaded opening in the stirrup member and pressing against the cap firmly to hold the latter in engagement with the sealing ring, said cap and socket member being provided with interfitting means to prevent the rotation of the cap member as the screw-threaded element is tightened thereby avoiding scoring of the sealing ring.

6. A sealing device of the class described comprising a connecting tube, a socket member secured to the tube with the end of the tube extending through the socket member, a sealing ring of yieldable material within the socket member, the socket member affording an annular groove in which the sealing ring is disposed, a tube of yieldable material in telescoping engagement with the end of the connecting tube, a plug detachably fitting within the end of said tube of yieldable material, a cap enclosing the last-named tube and having an edge engaging the sealing ring, and clamping means effective to press the cap against the sealing ring and thereby to hold the latter in tight engagement with the walls of the groove, said clamping means comprising a stirrup having opposite legs at the sides of the cap and socket with inturned end portions engaging the socket, and a screw-threaded member extending through an internally threaded opening in the stirrup member and pressing against the cap firmly to hold the latter in engagement with the sealing ring, said cap and socket member each providing an annular rib engaging and biting into the yieldable material of the sealing ring, said cap and socket member being provided with interfitting means to prevent the rotation of the cap member as the screw-threaded element is tightened, thereby avoiding scoring of the sealing ring.

7. In apparatus of the class described, a seal to preclude the leakage of atmospheric air into the apparatus, comprising cooperating parts with a yieldable sealing member therebetween, and clamping means to force said parts toward each other and to cause the firm engagement of the sealing member therewith, said parts having ribs which are pressed into the surface of the sealing member when the parts are forced against the same, and having interfitting portions to prevent relative rotation of said parts and rotation of either of the same relative to the sealing ring when the parts are thus forced together.

8. In apparatus of the class described, a duct, a sealing arrangement in combination therewith, said arrangement comprising a cup-like member secured in concentric relation to an end portion of the duct, an annular sealing element disposed about the duct and within the cup-like member, a cap having a lower edge engageable with the sealing member, and screw-threaded clamping means to press the cap downwardly against the sealing member and force the latter into firm engagement with the inner surface of the outer wall of the cup and the outer surface of the wall of the duct, said cup and cap having interfitting portions to prevent the rotation of the cap as the clamping means is tightened, thus avoiding scoring of the material of the sealing element.

9. A sealing device of the class described comprising a connecting tube, a socket member secured to the tube with the end of the tube extending through the socket member, a sealing ring of yieldable material within the socket member, the socket member affording an annular groove in which the sealing ring is disposed, a tube of yieldable material in telescoping engagement with the end of the connecting tube, a plug detachably fitting within the end of said tube of yieldable material, a cap enclosing the last-named tube and having an edge engaging the sealing ring, and clamping means effective to present the cap against the sealing ring and thereby to hold the latter in tight engagement with the walls of the groove, said cap and socket member providing interfitting portions to oppose rotation of the cap member as the clamping means is tightened, thus avoiding scoring of the material of the sealing ring.

10. A sealing device of the class described comprising a metal connecting tube, a metal socket member integrally connected to the tube, the tube having an end extending through the socket member, a detachable closure for the end of said tube, the socket member affording an annular space, a sealing ring of yieldable material in said space, a cap disposed over and about the closure and having an edge engaging the sealing ring, said socket and cap each having annular ribs to bite into the ring, screw threaded fastening means to press the cap against the ring and to cause the ribs to bite into said ring, said clamping means tending to cause rotation of the cap as said means is tightened, and interfitting parts on the cap and socket to prevent relative rotation thereof.

LYMAN F. WHITNEY.